(12) United States Patent
Garnett et al.

(10) Patent No.: US 7,309,300 B2
(45) Date of Patent: Dec. 18, 2007

(54) ELECTRIC DRIVE SYSTEM WITH PLURAL MOTORS

(75) Inventors: Stephen C. Garnett, Princeville, IL (US); Michael G. Cronin, Peoria, IL (US); Trevor N. Iund, Peoria, IL (US); Roy A. Wookey, Canton, IL (US)

(73) Assignee: Caterpillar Inc., Peoria, IL (US)

( * ) Notice: Subject to any disclaimer, the term of this patent is extended or adjusted under 35 U.S.C. 154(b) by 216 days.

(21) Appl. No.: 11/285,160

(22) Filed: Nov. 23, 2005

(65) Prior Publication Data

US 2007/0117669 A1    May 24, 2007

(51) Int. Cl.
  *B62D 11/06* (2006.01)
(52) U.S. Cl. .................................... 475/18
(58) Field of Classification Search ........... 475/18, 475/150, 151
  See application file for complete search history.

(56) References Cited

U.S. PATENT DOCUMENTS

| | | |
|---|---|---|
| 1,991,094 A | 2/1935 | Highley |
| 4,280,579 A | 7/1981 | Zaunberger et al. |
| 4,357,840 A | 11/1982 | Winzeler |
| 4,430,908 A | 2/1984 | Stockton |
| 4,434,680 A | 3/1984 | Riediger |
| 4,998,591 A | 3/1991 | Zaunberger |
| 5,168,946 A | 12/1992 | Dorgan |
| 5,195,600 A | 3/1993 | Dorgan |
| 5,509,491 A | 4/1996 | Hall, III |
| 5,620,387 A | 4/1997 | Janiszewski |
| 5,722,501 A | 3/1998 | Finch et al. |
| 5,851,162 A | 12/1998 | Tether |
| 5,919,109 A | 7/1999 | Fleckenstein |
| 6,024,182 A | 2/2000 | Hamada et al. |
| 6,125,953 A | 10/2000 | Arai et al. |
| 6,454,031 B2 | 9/2002 | Szymkowiak |
| 6,478,706 B1 | 11/2002 | Crabb |
| 6,491,599 B1 * | 12/2002 | Schmidt .................. 475/5 |
| 6,892,837 B2 | 5/2005 | Simmons et al. |

FOREIGN PATENT DOCUMENTS

| | | |
|---|---|---|
| DE | 44 01 894 | 7/1995 |
| WO | WO 91/04426 | 4/1991 |
| WO | WO 2005/110790 | 11/2005 |

* cited by examiner

*Primary Examiner*—Dirk Wright
(74) *Attorney, Agent, or Firm*—Finnegan, Henderson, Farabow, Garrett & Dunner

(57) ABSTRACT

An electric drive system is provided having first and second output members and a driving shaft having an axis or rotation. A plurality of electric motors are arranged adjacent to the driving shaft. Each motor has an output shaft in driving engagement with and substantially parallel to the driving shaft. A differential steering system is operably disposed between the driving shaft and the first and second output members. The differential steering system includes a first planetary gear assembly operably engaged both between the driving shaft and the first output member and between the driving shaft and the second output member. The first planetary gear assembly has an axis of rotation that substantially aligns with the axis of rotation of the driving shaft. A steering motor is operatively engaged with the differential steering system and operable to simultaneously adjust the relative rotational speed of the first and second output members.

28 Claims, 2 Drawing Sheets

ELECTRIC DRIVE SYSTEM WITH PLURAL MOTORS

TECHNICAL FIELD

The present disclosure is directed to an electric drive system and, more particularly, to an electric drive system with plural motors.

BACKGROUND

An electric drive may be used as source of driving power in a vehicle, such as, for example, an off-road work machine, a highway truck, or an automobile. An electric drive may supplement the driving power provided by an internal combustion engine or the electric drive may provide all of the driving power for the vehicle. Using an electric drive to supplement or replace the internal combustion engine may reduce the emissions generated during the operation of the vehicle. In addition, the electric drive may increase the fuel efficiency of the vehicle.

An electric drive typically includes a source of electrical power and an electric motor that is connected to one or more ground engaging devices on the vehicle. The source of electrical power, which may be, for example, a battery or an engine, provides the power that is used to operate the electric motor to generate an output torque. The output torque is transferred to the ground engaging devices on the vehicle to thereby propel the vehicle.

Some vehicles, such as tracked work machines, may include a differential steering system that is disposed between the electric motor and the ground engaging devices on the vehicle. A differential steering system may include one or more planetary gear assemblies and a steering motor. The differential steering system is operable to change the relative speeds of the ground engaging devices to thereby change the direction of travel of the vehicle. When a ground engaging device on one side of the vehicle is driven at a slower speed than a ground engaging device on the other side of the vehicle, the vehicle will tend to turn towards the slower moving ground engaging device.

In a typical electric drive, such as the electric drive described in U.S. Pat. No. 6,024,182 to Hamada et al., the output torque of an electric motor is transferred from the electric motor to a differential system through a gear transfer system that may include, for example, a bevel or spur gear arrangement. Plural drive motors may be provided for individually driving opposite ground engaging devices. However, the use of a bevel or spur gear arrangement is an inefficient method of transferring the torque of the individual motors to the ground engaging devices. Some of the torque generated by the electric motor may be lost in the torque transfer, and the plural motor arrangement is not space efficient. The gear losses decrease the efficiency of the electric drive and the overall efficiency of the vehicle. Additionally, space requirements for the individual motors and drives are high.

The disclosed electric drive system solves one or more of the problems set forth above.

SUMMARY OF THE INVENTION

One aspect of the disclosed system is directed to an electric drive system that includes a first output member, a second output member, and a driving shaft having an axis of rotation. A plurality of electric motors are arranged adjacent the driving shaft. Each electric motor includes an output shaft in driving engagement with and substantially parallel to the driving shaft. A differential steering system is operably disposed between the driving shaft and the first and second output members such that the driving shaft conveys torque from the electric motors to the differential steering system. The differential steering system includes a first planetary gear assembly operatively engaged between the driving shaft and the first output member and operatively engaged between the driving shaft and the second output member. The first planetary gear assembly has an axis of rotation that substantially aligns with the axis of rotation of the driving shaft. A steering motor is operatively engaged with the differential steering system and operable to simultaneously adjust the relative rotational speed of the first and second output members.

In another aspect, a method of operating an electric drive system of a vehicle is disclosed. A first electric motor having a first output shaft adjacent a driving shaft is disposed with the first output shaft parallel to the axis of the driving shaft. A second electric motor having a second output shaft adjacent the driving shaft is disposed with the second output shaft parallel to the axis of the driving shaft. A gear is disposed on each of the first and second output shafts. A gear is disposed on the driving shaft in driving engagement with the gears on each of the first and second output shafts. First and second output members are disposed on the vehicle. A differential steering system is disposed in driving engagement between the driving shaft and the first and second output members. The first and second electric motors are driven to rotate the gear on each of the first and second output shafts in the same direction of rotation to thereby drive the gear on the driving shaft and to thereby drive the first and second output members.

It is to be understood that both the foregoing general description and the following detailed description are exemplary and explanatory only and are not restrictive of the invention, as claimed.

DETAILED DESCRIPTION

Reference will now be made in detail to an exemplary embodiment of the present invention, which is illustrated in the accompanying drawings.

Figure 1:
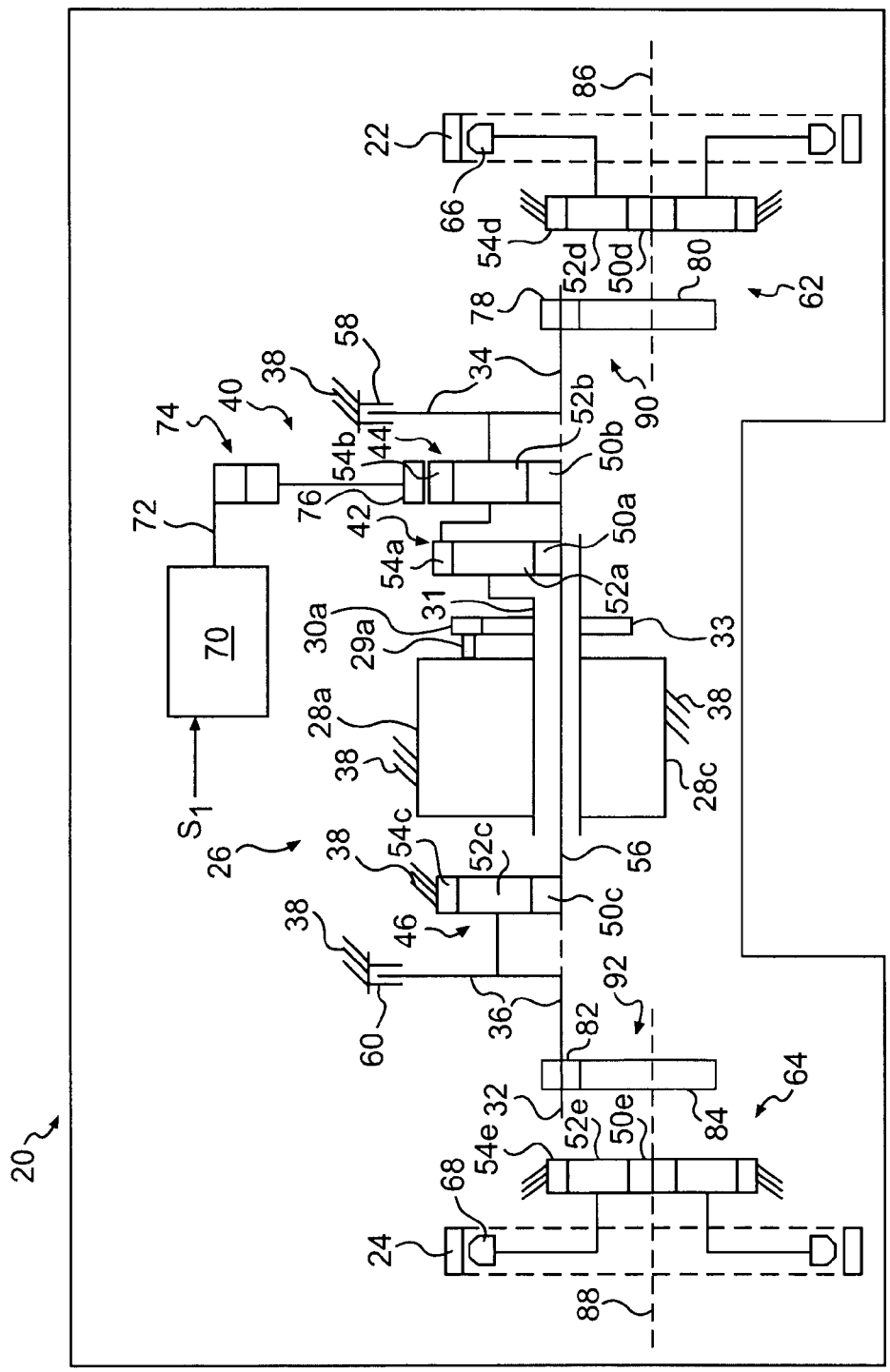
FIG. 1 is a schematic and diagrammatic representation of an electric drive system in accordance with an exemplary embodiment of the present invention.

As schematically and diagrammatically illustrated in FIG. 1, a vehicle 20 may include an electric drive system 26. Electric drive system 26 may be operatively engaged with a first ground engaging device 22 and a second ground engaging device 24. First and second ground engaging devices 22 and 24 may be, for example, tracks, belts, wheels, or any other ground engaging device readily apparent to one skilled in the art.

Figure 2:
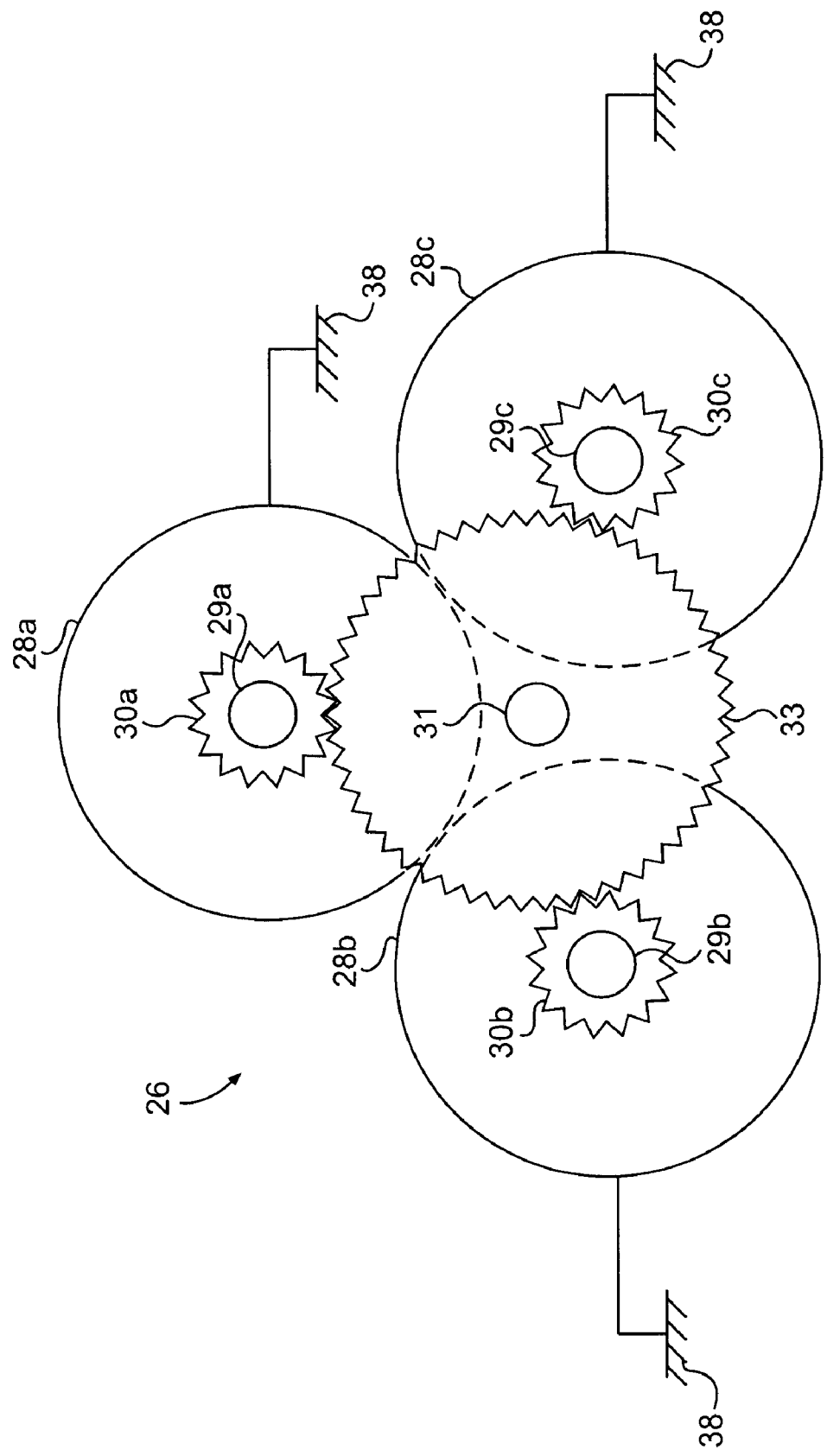
FIG. 2 is a diagrammatic illustration of an exemplary embodiment showing three electric motors arranged about a driving shaft.

As best shown in FIG. 2, electric drive system 26 includes a housing 38, and electric motors 28a, 28b, and 28c having output shafts 29a, 29b, and 29c, respectively. On each output shaft 29a, 29b, and 29c, is mounted a spur gear 30a, 30b, and 30c. The three spur gears 30a, 30b, and 30c may engage with a larger spur gear 33 mounted on a driving shaft 31. Thus, the three spur gears 30a, 30b, and 30c may be smaller than the spur gear 33 on driving shaft 31. The three electric motors 28a, 28b, and 28c may be arranged such that output shafts 29a, 29b, and 29c are either equally spaced or unequally spaced from one another about the axis of the driving shaft 31.

Vehicle 20 may include an electrical power source (not shown) that may be, for example, a battery or an engine, such as an internal combustion engine, with a generator. In response to an application of electrical power, electric motors 28a, 28b, and 28c exert a torque on driving shaft 31 by way of the intervening spur gears 30a, 30b, 30c, and 33. The magnitude and direction of the exerted torque depends upon the magnitude and polarity of the electrical power that is applied to electric motors 28a, 28b, and 28c.

In response to the exerted torque, driving shaft 31 may begin to rotate. As shown in FIG. 1, driving shaft 31 is configured to rotate about an axis of rotation that aligns with a reference axis 32. The speed at which driving shaft 31 rotates depends upon several factors, including, for example, the magnitude of the torque exerted by electric motors 28a, 28b, and 28c and the load on driving shaft 31.

Referring to FIG. 1, electric drive system 26 also includes a differential steering system 40, a first output member 34, and a second output member 36. First output member 34 is operatively connected to first ground engaging device 22. Second output member 36 is operatively connected to second ground engaging device 24.

In the illustrated embodiment, electric drive system 26 may include a first sprocket 66 and a second sprocket 68. First sprocket 66 may be connected to first output member 34 and configured to engage first ground engaging device 22. Second sprocket 68 may be connected to second output member 36 and configured to engage second ground engaging device 24. First and second sprockets 66 and 68 drive first and second ground engaging devices 22 and 24 in response to rotation of first and second output members 34 and 36.

In the exemplary embodiment illustrated in FIG. 1, differential steering system 40 includes a first planetary gear assembly 42, a second planetary gear assembly 44, and a third planetary gear assembly 46. One skilled in the art will recognize that differential steering system 40 may have a variety of different configurations and may include a greater or lesser number of planetary gear assemblies.

Each of the first, second, and third planetary gear assemblies 42, 44, and 46 includes a sun gear, a planet gear set, and a ring gear. Thus, first planetary gear assembly 42 includes sun gear 50a, planet gear set 52a, and ring gear 54a. Similarly, second planetary gear assembly 44 includes sun gear 50b, planet gear set 52b, and ring gear 54b. Likewise, third planetary gear assembly 46 includes sun gear 50c, planet gear set 52c, and ring gear 54c. Each sun gear 50a, 50b, 50c is configured to rotate about an axis and to mesh with the respective planet gear set 52a, 52b, 52c. Planet gear set 52a, 52b, 52c orbits about sun gear 50a, 50b, 50c and meshes with the respective ring gear 54a, 54b, 54c. Each ring gear 54a, 54b, 54c may be configured to rotate about the axis of rotation of sun gear 50a, 50b, 50c or each ring gear 54a, 54b, 54c may be fixed relative to housing 38 to prevent ring gear 54a, 54b, 54c from rotating.

As shown in FIG. 1, the rotational axis of each of first, second, and third planetary gear assemblies 42, 44, and 46 substantially aligns with the reference axis 32. In addition, the rotational axis of each sun gear 50a, 50b, 50c and each planet gear set 52a, 52b, 52c of each of first, second, and third planetary gear assemblies 42, 44, and 46 substantially aligns with the reference axis 32. Thus, the rotational axis of each of first, second, and third planetary gear assemblies 42, 44, and 46 substantially aligns with the rotational axis of driving shaft 31.

As one skilled in the art will recognize, a planetary gear assembly receives an input rotation at a first speed and generates a corresponding output rotation at a second speed. The change in rotational speed between the input and the output depends upon the number of teeth in sun gear 50a, 50b, 50c, planet gear set 52a, 52b, 52c, and ring gear 54a, 54b, 54c. The change in rotational speed also depends upon the gears that are used to receive the input rotation and the gear that is selected to provide the output rotation.

The input rotation may be delivered to a planetary gear assembly through one or two of sun gear 50a, 50b, 50c, planet gear set 52a, 52b, 52c, and ring gear 54a, 54b, 54c. If only one of sun gear 50a, 50b, 50c, planet gear set 52a, 52b, 52c, and ring gear 54a, 54b, 54c receives the input rotation, then one of sun gear 50a, 50b, 50c, planet gear set 52a, 52b, 52c, and ring gear 54a, 54b, 54c may be fixed to housing 38. The output rotation will be generated in the remaining one of sun gear 50a, 50b, 50c, planet gear set 52a, 52b, 52c, and ring gear 54a, 54b, 54c.

As shown, driving shaft 31 is suitably connected to planet gear set 52a of first planetary gear assembly 42. As shown in FIG. 1, first planetary gear assembly 42 is connected to both second planetary gear assembly 44 and third planetary gear assembly 46. Ring gear 54a of first planetary gear assembly 42 is connected to planet gear set 52b of second planetary gear assembly 44. A reaction member 56 connects sun gear 50a of first planetary gear assembly 42 to sun gear 50b of second planetary gear assembly 44 and sun gear 50c of third planetary gear assembly 46. As shown, driving shaft 31 may be hollow and include an opening through which reaction member 56 extends. In this manner, the rotational axis of reaction member 56 may also substantially align with reference axis 32.

First planetary gear assembly 42 provides an input rotation to both second planetary gear assembly 44 and third planetary gear assembly 46. A rotation of planet gear set 52a of first planetary gear assembly 42 causes a corresponding rotation of the associated sun gear 50a and of reaction member 56. The rotation of reaction member 56 provides an input rotation to sun gear 50b, 50c of both second and third planetary gear assemblies 44 and 46.

The rotation of sun gears 50b, 50c of second and third planetary gear assemblies 44 and 46 causes planet gear sets 52b, 52c to orbit about sun gears 50b, 50c. In the illustrated embodiment, first, second, and third planetary gear assemblies 42, 44, and 46 are configured so that when ring gears 54b, 54c of second and third planetary gear assembly 44 and 46 are held stationary, planet gear sets 52b, 52c will orbit about sun gears 50b, 50c at the same rotational speed. One skilled in the art will recognize that planetary gear assemblies 42, 44, and 46 may have a variety of gear reduction ratios, depending upon the expected operating conditions of vehicle 20.

The rotational speed of planet gear sets 52b, 52c of second and third planetary gear assemblies 44 and 46 provides the output rotation of second and third planetary gear assemblies 44 and 46. The rotational speed of planet gear set 52b of second planetary gear assembly 44 is transferred to first output member 34 to thereby drive first ground engaging device 22 at a corresponding speed. The rotational speed of planet gear set 52c of third planetary gear assembly 46 is transferred to second output member 36 to thereby drive second ground engaging device 24 at a corresponding speed.

The rotational speed of planet gear sets 52b, 52c of second and third planetary gear assemblies 44 and 46 may be altered by providing an additional input to one or both of the ring gears 54b, 54c in second and third planetary gear assemblies 44 and 46. In the illustrated embodiment, ring gear 54b of second planetary gear assembly 44 is configured to rotate about reference axis 32, whereas ring gear 54c of third planetary gear assembly 46 is fixed to housing 38. Alternatively, ring gear 54c of third planetary gear assembly 46 may be configured to rotate about reference axis 32 and ring gear 54b of second planetary gear assembly 44 may be fixed to housing 38 or both ring gears 54b, 54c may be configured to rotate about reference axis 32.

As illustrated in FIG. 1, vehicle 20 may also include a steering motor 70 that provides an additional input to differential steering system 40. Steering motor 70 is operable to rotate an output shaft 72. Steering motor 70 may be, for example, an electrical motor or a hydraulic motor.

In the illustrated embodiment, output shaft 72 is connected to ring gear 54b of second planetary gear assembly 44 through a set of transfer gears 74 and an engagement gear 76. Rotation of output shaft 72 in a first direction will cause ring gear 54b of second planetary gear assembly 44 to rotate in a first direction. Rotation of output shaft 72 in a second direction will cause ring gear 54b of second planetary gear assembly 44 to rotate in the opposite direction.

The operation of steering motor 70 may be governed by an input signal $S_1$. The input signal $S_1$ may be generated by a control (not shown) in response to an instruction from an operator to turn the vehicle in a certain direction at a certain turning radius. The control may control steering motor 70 to generate a desired direction and speed of rotation in driving shaft 31.

As also illustrated in FIG. 1, a first brake 58 may be configured to engage first output member 34 and a second brake 60 may be configured to engage second output member 36. First and second brakes 58 and 60 may be operated to reduce the rotational speed of first and second output members 34 and 36, respectively. First and second brakes 58 and 60 may therefore be operated to reduce the speed of vehicle 20. In addition, first and second brakes 58 and 60 may be engaged with first and second output members 34 and 36, respectively, when vehicle 20 is stationary to thereby prevent vehicle 20 from moving.

As further shown in FIG. 1, a first final drive 62 may be disposed between first output member 34 and first sprocket 66 and a second final drive 64 may be disposed between second output member 36 and second sprocket 68. Each final drive 62 and 64 may include a planetary gear assembly that includes a sun gear 50d, 50e, a planet gear set 52d, 52e, and a ring gear 54d, 54e. First output member 34 may be suitably drivingly connected to the planetary gear assembly in first final drive 62 through a spur gear assembly 90 having gears 78 and 80. Second output member 36 may be suitably drivingly connected to the planetary gear assembly in second final drive 64 through a spur gear assembly 92 having gears 82 and 84. First final drive 62 may have a drive axis 86 offset from the reference axis 32 that is the axis of rotation of the driving shaft 31. In like manner, second final drive 64 may have a drive axis 88 offset from the reference axis 32 that is the axis of rotation of the driving shaft 31.

Each final drive 62 and 64 may provide a gear reduction between the first and second output members 34 and 36 and first and second sprockets 66 and 68. For example, the gear reduction of first and second final drives 62 and 64 may be 5:1. One skilled in the art will recognize that final drives 62 and 64 may provide any gear reduction to meet the operational requirements of vehicle 20.

In operating the electric drive system for a vehicle 20, electric motors 28a, 28b, and 28c may be disposed with their respective output shafts 29a, 29b, and 29c parallel to driving shaft 31. Spur gears 30a, 30b, and 30c may be driven in the same direction of rotation to thereby drive spur gear 33. Spur gear 33 may then cause rotation of driving shaft 31. Differential steering system 40 may be disposed in driving engagement between driving shaft 31 and first and second output members 34, 36. Output members 34, 36 may, in turn, drive ground engaging members 22, 24 through final drives 62, 64, respectively. The axes 86, 88 of final drives 62, 64 may be so located as to be offset from the reference axis 32 that extends along the axis of rotation of driving shaft 31.

INDUSTRIAL APPLICABILITY

An electric drive 26 according to the present disclosure may be included in a vehicle 20 to propel the vehicle 20. Vehicle 20 may be, for example, a work machine, such as a track layer. One skilled in the art will recognize that electric drive 26 may be included in other types of vehicles, such as, for example, other work machines, on or off highway trucks, or automobiles.

Vehicle 20 may include an internal combustion engine or an electrical storage device that supplies electrical power to electric drive 26. A control may govern the generation and/or supply of electrical power to electric drive 26 in response to instructions from an operator. For example, the supply of electrical power to electric drive 26 may be increased when the operator provides an instruction to increase the speed of vehicle 20.

In response to the application of electric power to electric drive 26, electric motors 28a, 28b, and 28c exerts a torque on driving shaft 31. The magnitude and polarity of the electrical power applied to the electric motors 28a, 28b, and 28c determine the direction and magnitude of the torque exerted on driving shaft 31. The torque exerted by electric motors 28a, 28b, and 28c causes driving shaft 31 to rotate.

The rotational speed of driving shaft 31 is directed as an input to first planet gear set 52a of first planetary gear assembly 42 in differential steering system 40. The rotational speed of planet gear set 52a of first planetary gear assembly 42 causes a corresponding rotation of sun gear 50a of first planetary gear assembly 42 and of reaction member 56.

The rotation of reaction member 56 drives sun gears 50b, 50c of second and third planetary gear assemblies 44 and 46. The rotation of sun gears 50b, 50c of second and third planetary gear assemblies 44 and 46 causes planet gear sets 52b, 52c of both second and third planetary gear assemblies 44 and 46 to rotate. The rotation of planet gear set 52b of second planetary gear assembly 44 is transferred through first final drive 62 and first sprocket 66 to thereby drive first ground engaging device 22. The rotation of planet gear set 52 of third planetary gear assembly 46 is transferred through second final drive 64 and second sprocket 68 to thereby drive second ground engaging device 24.

When the operator instructs the vehicle to travel in a straight line, steering motor 70 is held stationary. Steering motor 70 exerts a resistive torque against ring gear 54b of second planetary gear assembly 44 to thereby prevent ring gear 54b from rotating. Accordingly, planet gear sets 52b, 52c of both second and third planetary gear assemblies 44 and 46 will rotate at substantially the same speed. This results in the first and second ground engaging devices 22 and 24 being driven at substantially the same speed. Thus, when ring gear 54b of second planetary gear assembly 44 is stationary, vehicle 20 will travel in substantially a straight line.

When the operator instructs the vehicle to turn in a certain direction, steering motor 70 is operated to provide an additional input into differential steering system 40. Steering motor 70 may cause ring gear 54b of second planetary gear assembly 44 to rotate in a first direction at a certain speed to cause vehicle 20 to turn in a first direction at a certain turning radius. Steering motor 70 may also cause ring gear 54b of second planetary gear assembly 44 to rotate in a second direction at a certain speed to cause vehicle 20 to turn in a second direction at a certain turning radius.

Rotating ring gear 54b of second planetary gear assembly 44 in a first direction may decrease the rotational speed of planet gear set 52b of second planetary gear assembly 44 relative to the rotational speed of planet gear set 52c of third planetary gear assembly 46. This change in the relative speeds causes first output member 34 to rotate slower than second output member 36. Thus, first ground engaging device 22 will be driven at a slower speed than second ground engaging device 24. This will cause vehicle 20 to turn in the direction of first ground engaging device 22.

Rotating ring gear 54b of second planetary gear assembly 44 in a second direction may increase the rotational speed of planet gear set 52b of second planetary gear assembly 44 relative to the rotational speed of planet gear set 52c of third planetary gear assembly 46. This change in relative speed causes first output member 34 to rotate faster than second output member 36. Thus, first ground engaging device 22 will be driven at a faster speed than second ground engaging device 24. This will cause vehicle 20 to turn in the direction of second ground engaging device 24.

The turning rate of vehicle 20 is determined by the magnitude of the difference in relative speeds of first and second ground engaging devices 22 and 24. Increasing the rotational speed of ring gear 54b of second planetary gear assembly 44 will increase the magnitude of the difference in rotational speed between first and second output members 34 and 36. Thus, an increase in the rotational speed of output shaft 72 of steering motor 70 will cause an increase in the turning rate of vehicle 20. Conversely, a decrease in the rotational speed of output shaft 72 of steering motor 70 will cause a decrease in the turning rate of vehicle 20.

As will be apparent from the foregoing description, an electric drive system 26 is provided in which the rotational axis of a driving shaft 31 is driven by a plurality of electric motors 28a, 28b, and 28c. The driving shaft 31 substantially aligns with the rotational axis of a differential steering system 40. By employing a plurality of electric motors surrounding the driving shaft 31, the axial length of the electric drive system 26 extending between the ground engaging devices 22, 24 may be reduced relative to that which would be necessary with a single larger electric motor either adjacent to or concentric to the driving shaft 31. This results in a savings of space in the drive assembly. Additionally, use of a plurality of smaller electric motors gives a reduction in the rotational inertia. Rotational inertia increases energy requirements when a large vehicle or work machine slows, starts, or stops. Thus, reduction in rotational inertia resulting from the use of a plurality of smaller electric motors instead of a single, larger electric motor yields a faster response by the vehicle or work machine. Furthermore, the power output of plural, smaller electric motors is comparable to that of a single, larger electric motor.

It will be apparent to those skilled in the art that various modifications and variations can be made in the disclosed electric drive system. Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. An electric drive system, comprising:
   a first output member;
   a second output member;
   a driving shaft having an axis of rotation;
   a plurality of electric motors arranged adjacent to the driving shaft, each of the plurality of electric motors having an output shaft in driving engagement with and substantially parallel to the driving shaft;
   a differential steering system operably disposed between the driving shaft and the first and second output members such that the driving shaft conveys torque from the electric motors to the differential steering system, the differential steering system including a first planetary gear assembly operatively engaged between the driving shaft and the first output member and operatively engaged between the driving shaft and the second output member, the first planetary gear assembly having an axis of rotation that substantially aligns with the axis of rotation of the driving shaft; and
   a steering motor operatively engaged with the differential steering system and operable to simultaneously adjust the relative rotational speed of the first and second output members.

2. The electric drive system of claim 1, wherein the plurality of electric motors is three electric motors.

3. The electric drive system of claim 2, wherein the three electric motors are arranged such that the output shafts of the three electric motors are spaced from one another about the axis of the driving shaft.

4. The electric drive system of claim 1, wherein the driving engagement includes a spur gear on the output shaft of each of the plurality of electric motors engaged with a spur gear on the driving shaft.

5. The electric drive system of claim 4, wherein the spur gear on each output shaft is smaller than the spur gear on the driving shaft.

6. The electric drive system of claim 1, wherein the differential steering system includes a second planetary gear assembly operatively engaged between the first planetary gear assembly and the first output member, and wherein the differential steering assembly includes a third planetary gear assembly operatively engaged between the first planetary gear assembly and the second output member.

7. The electric drive system of claim 6, wherein the first planetary gear assembly includes a planet gear set, and wherein the driving shaft directly drives the planet gear set.

8. An electric drive system, comprising:
   a first output member;
   a second output member;
   a driving shaft having an axis of rotation;
   a plurality of electric motors arranged adjacent to the driving shaft, each of the plurality of electric motors having an output shaft in driving engagement with and substantially parallel to the driving shaft;
   a differential steering system operably disposed between the driving shaft and the first and second output members such that the driving shaft conveys torque from the electric motors to the differential steering system;

a steering motor operatively engaged with the differential steering system and operable to simultaneously adjust the relative rotational speed of the first and second output members;

a first final drive assembly driven by the first output member and having a first drive axis offset from the axis of rotation of the driving shaft; and a second final drive assembly driven by the second output member and having a second drive axis offset from the axis of rotation of the driving shaft.

9. The electric drive system of claim 8, wherein the first final drive assembly includes a planetary gear assembly having a sun gear, a planet gear set, and a ring gear;

the second final drive assembly includes a planetary gear assembly having a sun gear, a planet gear set, and a ring gear;

a first sprocket drivingly connected to the planet gear set of the first final drive assembly; and a second sprocket drivingly connected to the planet gear set of the second final drive assembly.

10. The electric drive system of claim 9, wherein the sun gear of the planetary gear assembly of the first final drive assembly is driven by a spur gear assembly; and the sun gear of the planetary gear assembly of the second final drive assembly is driven by a spur gear assembly.

11. The electric drive system of claim 8, wherein the plurality of electric motors is three electric motors.

12. A method of operating an electric drive system of a vehicle, comprising:

disposing a first electric motor having a first output shaft adjacent a driving shaft with the first output shaft parallel to the axis of the driving shaft;

disposing a second electric motor having a second output shaft adjacent the driving shaft with the second output shaft parallel to the axis of the driving shaft;

disposing a gear on each of the first and second output shafts;

disposing a gear on the driving shaft in driving engagement with the gears on each of the first and second output shafts;

disposing first and second output members on the vehicle;

disposing a differential steering system in driving engagement between the driving shaft and the first and second output members;

driving the first and second electric motors to rotate the gear on each of the first and second output shafts in the same direction of rotation to thereby drive the gear on the driving shaft and to thereby drive the first and second output members.

13. The method of claim 12, further including disposing a third electric motor having a third output shaft adjacent the driving shaft with the third output shaft parallel to the driving shaft;

disposing a gear on the third output shaft in engagement with the gear on the driving shaft; and driving the third electric motor to rotate the gear on the third output shaft in the same direction as the gears on the first and second output shafts.

14. The method of claim 12, further including driving a first ground engaging member with the first output member and driving a second ground engaging member with the second output member.

15. The method of claim 14, further including disposing a first final drive between the first output member and the first ground engaging member;

disposing a second final drive between the second output member and the second ground engaging member.

16. The method of claim 15, further including disposing the first final drive along a drive axis offset from the axis of rotation of the driving shaft;

disposing the second final drive along a drive axis offset from the axis of rotation of the driving shaft.

17. The method of claim 12, further including disposing a first planetary gear assembly having a sun gear, a planet gear set, and a ring gear, within the differential steering system;

driving the first planetary gear assembly by connecting the driving shaft to the planet gear set of the first planetary gear assembly.

18. The method of claim 17, further including disposing second and third planetary gear assemblies, each including a sun gear, a planet gear set, and a ring gear, within the differential steering system;

connecting the second planetary gear assembly to the first output member;

connecting the third planetary gear assembly to the second output member.

19. The method of claim 18, further including providing a reaction member connected between the sun gears of each of first, second, and third planetary gear assemblies;

driving the second and third planetary gear assemblies from the first planetary gear assembly through the reaction member.

20. A vehicle, comprising:

a first ground engaging device;

a second ground engaging device;

a first output member connected to the first ground engaging device;

a second output member connected to the second ground engaging device;

a driving shaft having an axis of rotation;

a plurality of electric motors arranged adjacent to the driving shaft and each having an output shaft substantially parallel to and in driving engagement with the driving shaft;

a differential steering system operably disposed between the driving shaft and the first and second output members such that the driving shaft conveys torque from the electric motors to the differential steering system, the differential steering system including a first planetary gear assembly operatively engaged between the driving shaft and the first output member and operatively engaged between the driving shaft and the second output member, the first planetary gear assembly having an axis of rotation that substantially aligns with the axis of rotation of the driving shaft; and a steering motor operatively engaged with the differential steering system and operable to simultaneously adjust the relative rotational speed of the first and second output members.

21. The vehicle of claim 20, wherein the plurality of electric motors is three electric motors.

22. The vehicle of claim 21, wherein the three electric motors are spaced from one another about the axis of the driving shaft.

23. The vehicle of claim 20, wherein the driving engagement includes a spur gear on the output shaft of each of the plurality of electric motors in engagement with a spur gear on the driving shaft, and wherein the spur gears on the output shafts are smaller than the spur gear on the driving shaft.

24. The vehicle of claim 20, wherein the differential steering system includes a second planetary gear assembly operatively engaged between the first planetary gear assembly and the first output member, and wherein the differential steering assembly includes a third planetary gear assembly operatively engaged between the first planetary gear assembly and the second output member.

25. The vehicle of claim 20, wherein the first planetary gear assembly includes a planet gear set, and wherein the driving shaft directly drives the planet gear set.

26. The vehicle of claim 20, wherein the first and second ground engaging devices are tracks and the first and second ground engaging devices are disposed on opposite sides of the vehicle.

27. The vehicle of claim 20, including a first final drive assembly between the first output member and the first ground engaging member; and a second final drive assembly between the second output member and the second ground engaging member.

28. The vehicle of claim 27, wherein the first final drive assembly includes a drive axis offset from the axis of rotation of the driving shaft; and the second final drive assembly includes a drive axis offset from the axis of rotation of the driving shaft.

* * * * *